US010632887B2

(12) United States Patent
Yamaguchi et al.

(10) Patent No.: US 10,632,887 B2
(45) Date of Patent: Apr. 28, 2020

(54) HEADREST STORAGE STRUCTURE

(71) Applicant: HONDA MOTOR CO., LTD., Tokyo (JP)

(72) Inventors: Taku Yamaguchi, Wako (JP); Maki Yamaguchi, Wako (JP); Atsushi Ito, Wako (JP); Kenichi Toyonaga, Haga-machi (JP); Maiko Haneishi, Haga-machi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 16/127,448

(22) Filed: Sep. 11, 2018

(65) Prior Publication Data

US 2019/0118689 A1 Apr. 25, 2019

(30) Foreign Application Priority Data

Oct. 24, 2017 (JP) ................................ 2017-205512

(51) Int. Cl.

*B60N 2/882* (2018.01)
*B60R 7/04* (2006.01)
*B60N 2/30* (2006.01)
*B60N 2/874* (2018.01)

(52) U.S. Cl.

CPC ............... *B60N 2/882* (2018.02); *B60N 2/30* (2013.01); *B60N 2/874* (2018.02); *B60R 7/04* (2013.01)

(58) Field of Classification Search

CPC .......... B60J 5/04; B60J 5/0412; B60J 5/0413; B60N 2/30; B60N 2/36; B60N 2/80; B60N 2/806; B60N 2/874; B60N 2/882; B60R 7/04; B60R 7/046

USPC ................................ 296/37.13, 65.01, 65.03

See application file for complete search history.

(56) References Cited

U.S. PATENT DOCUMENTS

| | | | | |
|---|---|---|---|---|
| 6,203,104 | B1 * | 3/2001 | Matsuo ................ | B60N 2/3013 297/188.1 |
| 6,331,027 | B1 * | 12/2001 | Wiedmayer ............ | B60N 2/882 296/37.8 |
| 7,896,433 | B2 * | 3/2011 | Mayer .................... | B60N 2/686 297/188.06 |

FOREIGN PATENT DOCUMENTS

| | | |
|---|---|---|
| JP | S58-115431 U | 8/1983 |
| JP | S61-193842 U | 12/1986 |
| JP | S63-165248 U | 10/1988 |
| JP | H11-245704 A | 9/1999 |
| JP | 2002-160565 A | 6/2002 |

(Continued)

OTHER PUBLICATIONS

English translation of JP 2005-059810; retreived via PatentTranslate located at www.epo.org. (Year: 2019).*

(Continued)

*Primary Examiner* — Jason S Daniels

(74) *Attorney, Agent, or Firm* — Thomas | Horstemeyer, LLP

(57) ABSTRACT

A headrest storage structure includes a headrest storage portion configured to store a headrest in an interior member of a vehicle door. The headrest storage portion includes a headrest fixing portion configured to store a headrest main body and a headrest pillar fixing portion configured to store a headrest pillar portion extending from the headrest main body, and the headrest fixing portion and the headrest pillar fixing portion are arranged to be adjacent to each other in a longitudinal direction of a vehicle body.

13 Claims, 4 Drawing Sheets

(56) References Cited

FOREIGN PATENT DOCUMENTS

| | | | |
|---|---|---|---|
| JP | 2005-059810 | A | 3/2005 |
| JP | 2012-126203 | A | 7/2012 |

OTHER PUBLICATIONS

Japanese Office Action (w/ partial English translation) issued for Japanese Patent Application No. 2017-205512 dated Mar. 11, 2019.

* cited by examiner

HEADREST STORAGE STRUCTURE

CROSS-REFERENCE TO RELATED APPLICATIONS

The present application claims priority under 35 U.S.C. § 119 to Japanese Patent Application No. 2017-205512, filed Oct. 24, 2017. The contents of this application is incorporated herein by reference in its entirety.

BACKGROUND OF THE INVENTION

Field of the Invention

The present invention relates to a structure for storing a headrest removed from a seat.

Description of the Related Art

In each of Japanese Utility Model Laid-Open Nos. 63-165248, 58-115431, and 61-193842 and Japanese Patent Laid-Open No. 2005-059810, there is proposed a structure for holding or storing a headrest removed from a seat. Each of Japanese Utility Model Laid-Open Nos. 63-165248 and 58-115431 describes a structure for inserting a headrest pillar into a door armrest. Japanese Utility Model Laid-Open No. 61-193842 describes a structure for storing a headrest 3 into a pocket 2 and fixing leg portions 6 at the upper portion of the headrest 3. Japanese Patent Laid-Open No. 2005-059810 describes a structure for inserting headrest stays 91 of a headrest 9 into holding holes 14 of a door pocket bottom portion 13 and fixed the headrest 9.

In recent years, along with a variety of vehicle seat arrangements, there is commercially available a vehicle arranged such that the seatbacks of the front and rear seats are laid down forward to obtain a full-flat state. In such a vehicle, there is still room for improving the storage location and storage method of a headrest removed from a seat to lay down the seatback.

SUMMARY OF THE INVENTION

The present invention has been made in consideration of the aforementioned problems, and realizes a headrest storage structure capable of appropriately storing a headrest on a door side surface on the interior side of a vehicle compartment.

In order to solve the aforementioned problems, the first aspect of the present invention provides a headrest storage structure including a headrest storage portion configured to store a headrest in an interior member of a vehicle door, wherein the headrest storage portion includes a headrest fixing portion configured to store a headrest main body and a headrest pillar fixing portion configured to store a headrest pillar portion extending from the headrest main body, and the headrest fixing portion and the headrest pillar fixing portion are arranged to be adjacent to each other in a longitudinal direction of a vehicle body.

According to the present invention, the headrest storage structure can appropriately store the headrest on the door side surface on the interior side of the vehicle compartment.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

DESCRIPTION OF THE EMBODIMENTS

An embodiment of the present invention will be described in detail with reference to the accompanying drawings.

Figure 1:
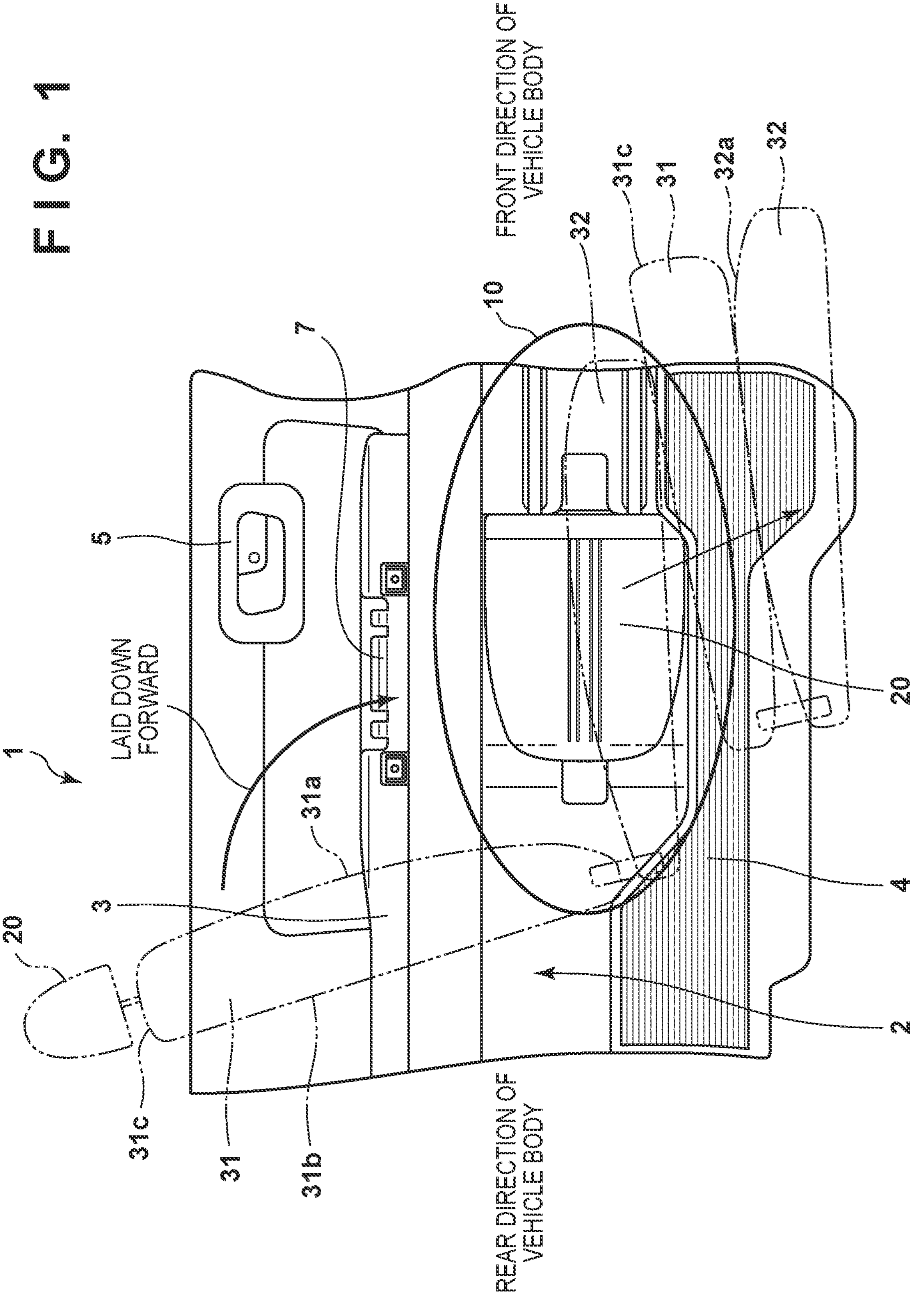
FIG. 1 is a view of a passenger door having a headrest storage structure of this embodiment when viewed from the interior side of the vehicle compartment.
Figure 2A:
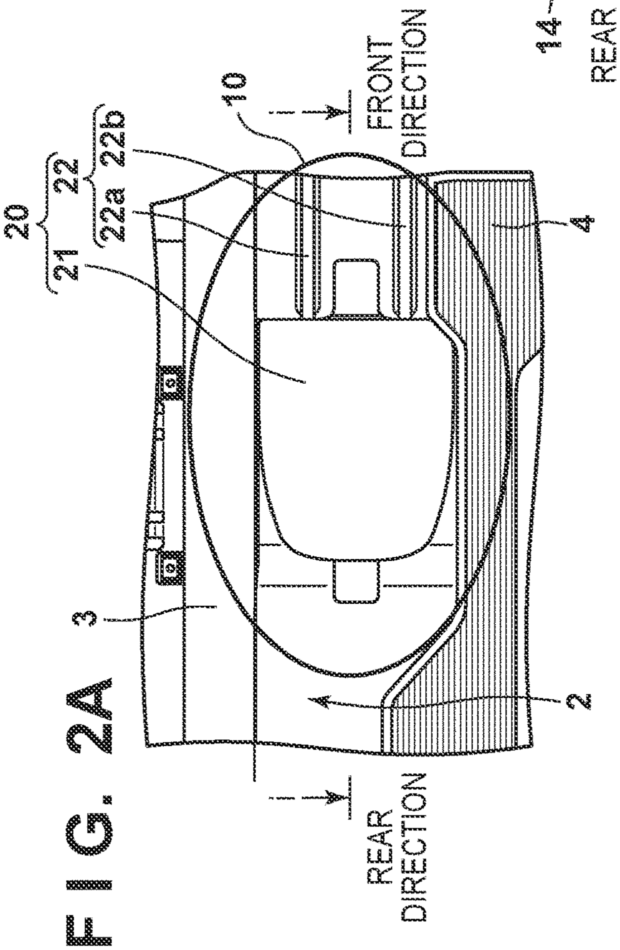
FIG. 2A is an enlarged view of a headrest storage portion in FIG. 1.
Figure 2B:
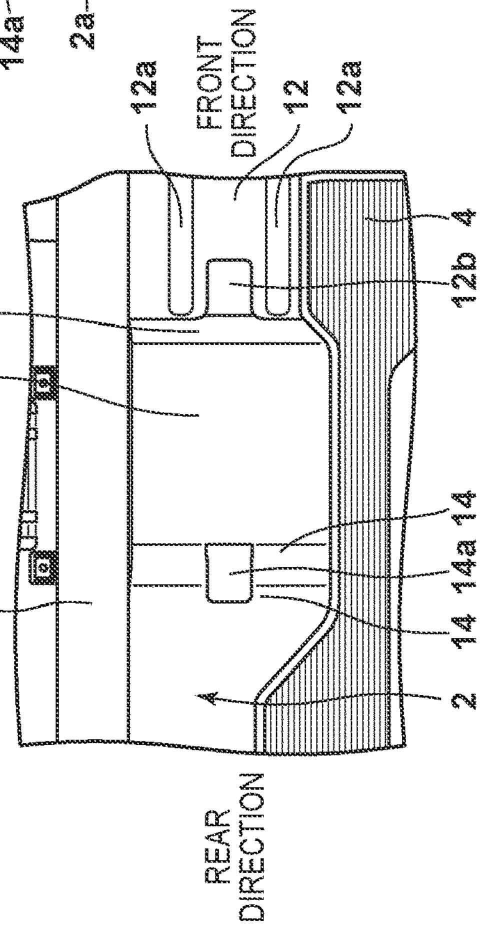
FIG. 2B is a view showing a state in which the headrest is removed from the state in FIG. 2A.
Figure 2C:
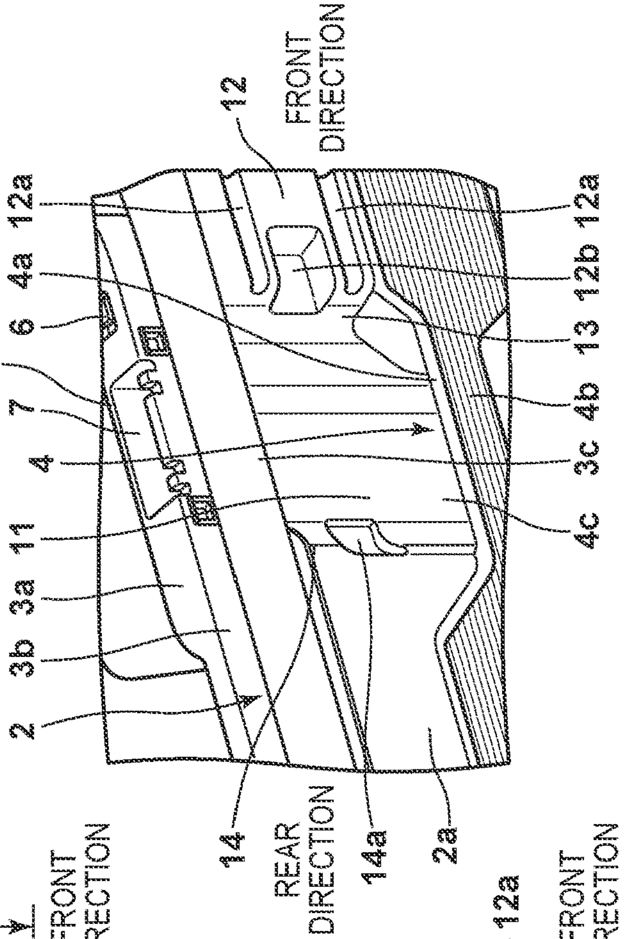
FIG. 2C is a view of the state of FIG. 2B when viewed from the oblique rear direction.
Figure 3:
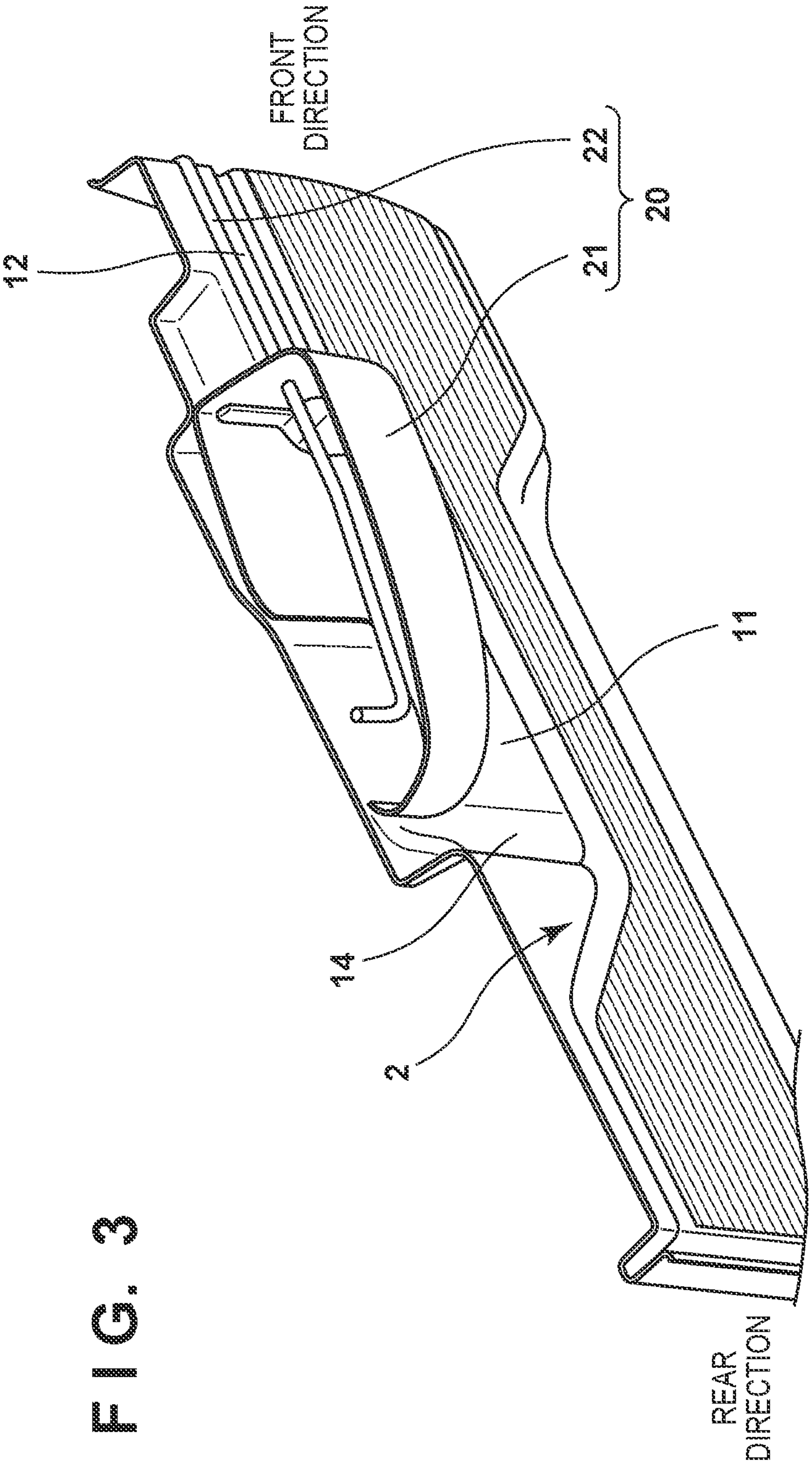
FIG. 3 is a view of a section i-i of FIG. 2A when viewed from the oblique rear direction.
Figures 4A, 4B, 4C:
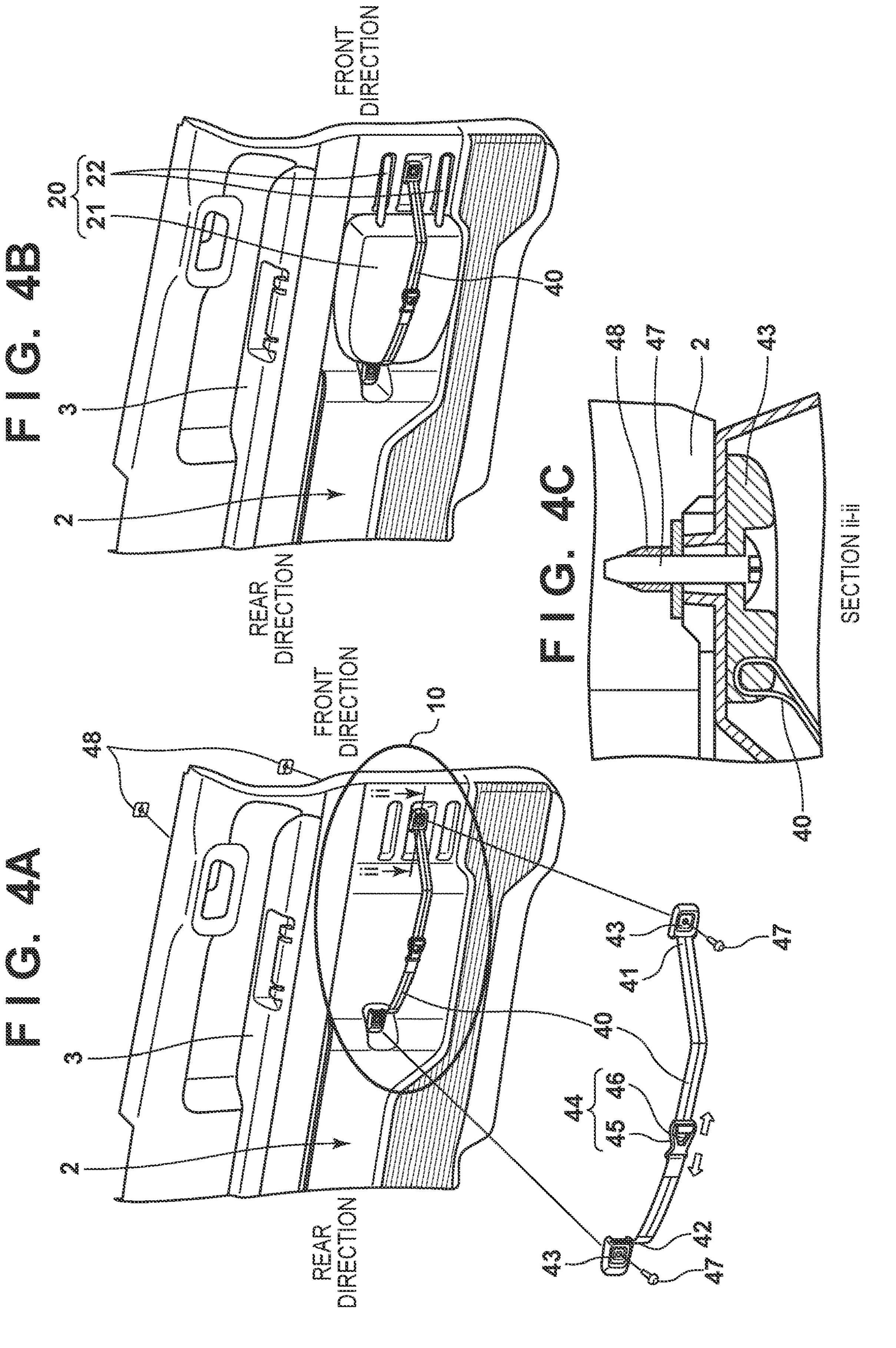
FIG. 4A is a perspective view of the headrest storage structure of this embodiment, showing a state in which the headrest is not stored.
FIG. 4B is a perspective view of the headrest storage structure of this embodiment, showing a state in which the headrest is stored.
FIG. 4C is a perspective view of the headrest storage structure of this embodiment, showing a section ii-ii in FIG. 4A.

FIG. 1 is a view of a passenger door having a headrest storage structure of this embodiment when viewed from the interior side of the vehicle compartment. FIG. 2A is an enlarged view of a headrest storage portion in FIG. 1. FIG. 2B is a view showing a state in which the headrest is removed from the state in FIG. 2A. FIG. 2C is a view of the state of FIG. 2B when viewed from the oblique rear direction. FIG. 3 is a view of a section i-i of FIG. 2A when viewed from the oblique rear direction. FIG. 4A is a perspective view of the headrest storage structure of this embodiment, showing a state in which the headrest is not stored. FIG. 4B is a perspective view of the headrest storage structure of this embodiment, showing a state in which the headrest is stored. FIG. 4C is a perspective view of the headrest storage structure of this embodiment, showing a section ii-ii in FIG. 4A.

The headrest storage structure of this embodiment includes a headrest storage portion 10 formed in part of a door trim 2 mounted, on the interior side of the vehicle compartment, of a door panel (inner panel) (not shown) of a door mounted to be opened/closed on a vehicle body. Note that a headrest storage structure arranged on a passenger door 1 will be described as an example. However, the present invention is not limited to this. The door on which the headrest storage structure is mounted may be a driver's door or rear seat door. In addition, the door is not limited to a hinge door, but can be a slide door. The door trim 2 is a resin molded body.

In the vehicle of this embodiment, a seatback 31 of a seat 30 (for example, the passenger seat if the door is the passenger door 1) adjacent to the door 1 can be laid down forward, and a seat cushion 32 can be displaced downward. The seatback 31 can be laid down toward the seat cushion 32 in a positional relationship that a front surface portion (backrest portion) 31*a* of the seatback 31 faces an upper surface portion (seating surface) 32*a* of the seat cushion 32.

The seat cushion 32 is displaced downward when the seatback 31 is laid down forward. In the posture that the seatback 31 is kept laid down forward, a back surface portion 31*b* of the seatback 31 forms a flat surface in the horizontal direction. A full-flat floor can be formed in the vehicle compartment by laying down other sheets forward.

A headrest 20 includes a headrest main body 21 and a headrest pillar portion 22. The headrest pillar portion 22 includes two shaft portions 22*a* and 22*b* extending from the headrest main body 21. The headrest 20 is mounted on an upper end portion 31*c* of the seatback 31 by the headrest pillar portion 22, and the headrest main body 21 is arranged on the back of the head of an occupant. In addition, the headrest pillar portion 22 can be detached from the upper end portion 31*c* of the seatback 31, so that the headrest 20 can be removed from the seatback 31 when the seatback 31 is to be laid down forward.

The armrest 3 is arranged on the door trim 2 near an elbow height position of a sitting occupant. The armrest 3 extends toward the interior side of the vehicle compartment, and the upper portion of the door trim 2 rather than the central portion in the vertical direction extends in the longitudinal direction of the vehicle body. The armrest 3 includes an upper surface portion 3*a* which allows the occupant to rest his elbow, a side surface portion 3*b* continuous from the upper surface portion 3*a* toward the downward location on the interior side of the vehicle compartment, and a bottom surface portion 3*c*. A lower pocket 4 capable of storing articles having various shapes such as columnar and box-like shapes is arranged in the door trim 2. The lower pocket 4 is arranged below the armrest 3 and has a storage hole 4*a* open upward so as to hold articles. A pull handle mounting portion 5 on which a pull handle operated by the seating occupant to open/close the door is mounted is arranged in the door trim 2 above the armrest 3.

A switch mounting portion 6 on which a switch for allowing the seating occupant to open/close the window glass and a pull pocket 7 which allows the occupant to hold it with a hand when opening/closing the door are arranged on the upper surface portion 3*a* of the armrest 3. The pull pocket 7 is located above the lower pocket 4. The pull pocket 7 has a hole portion 7*a* open to the upper surface portion 3*a* of the armrest 3.

The headrest storage structure of this embodiment includes the headrest storage portion 10 formed between the bottom surface portion 3*c* of the armrest 3 and a storage hole 4*a* of the lower pocket 4 in the vertical direction of the door trim 2. The headrest storage portion 10 includes a headrest fixing portion 11 recessed more toward the exterior of the vehicle than another side surface 2*a* of the door trim 2 on the interior side of the vehicle compartment and a headrest pillar fixing portion 12 arranged toward the front of the vehicle body with respect to the headrest fixing portion 11. The headrest fixing portion 11 forms a step with the bottom surface portion 3*c* of the armrest 3 and extends in the depth direction of the lower pocket 4 so as to form a side surface 4*c* facing a side wall portion 4*b* of the lower pocket 4 on the interior side of the vehicle compartment.

The headrest fixing portion 11 in the headrest storage portion 10 includes a front step portion 13 on the front side of the vehicle body and a rear step portion 14 on the rear side of the vehicle body. The front step portion 13 continues to the headrest pillar fixing portion 12. The rear step portion 14 has a curved shape recessed to incline toward the exterior of the vehicle in the front side of the vehicle body. Since the rear step portion 14 in the headrest fixing portion 11 has the curved shape recessed toward the exterior of the vehicle, the headrest storage structure has a guide function when extracting/storing the headrest 20, thereby smoothly extracting/storing the headrest 20.

In this embodiment, as described above, when the headrest 20 is removed from the seatback 31, the headrest 20 can be stored in the headrest storage portion 10 on the door side surface on the interior side of the vehicle compartment. In the headrest 20, the headrest main body 21 is stored in the convex-shaped headrest fixing portion 11 in the headrest storage portion 10, and the headrest pillar portion 22 is stored in a groove portion 12*a* formed in the flat headrest pillar fixing portion 12. In this manner, since the rod-like headrest pillar portion 22 can be stored in the groove portion 12*a*, the headrest 20 can be more easily and stably held than a conventional structure in which the headrest pillar portion 22 is held via a hole. The headrest 20 can be stored while reducing the extension amount of the headrest pillar portion 22 toward the interior side of the vehicle compartment. In addition, the rigidity can be improved more by forming the groove portion 12*a* in the headrest pillar fixing portion 12 than the flat shape.

The headrest 20 stored in the headrest storage portion 10 is held so as to prevent the headrest 20 from dropping from the headrest storage portion 10 by a restraint member 40 bridged in the longitudinal direction of the vehicle body. The restraint member 40 can be formed from a member such as a band, a string, or a wire which can fix the headrest 20 so as to prevent the headrest 20 from dropping from the headrest storage portion 10. In this manner, by fixing the headrest main body 21 in the headrest fixing portion 11 by the restraint member 40, the headrest 20 is fixed, and at the same time, stability upon storing a flat article such as a file in the lower pocket 4 can be improved.

In the restraint member 40, a front end portion 41 is fixed to a recessed portion 12*b* of the headrest pillar fixing portion 12, and a rear end portion 42 is fixed to a recessed portion 14*a* of the rear step portion 14 of the headrest fixing portion 11. The front end portion 41 and the rear end portion 42 of the restraint member 40 are attached to front and rear base portions 43, respectively. The base portions 43 are fixed to the recessed portion 12*b* of the headrest pillar fixing portion 12 and the recessed portion 14*a* of the headrest fixing portion 11 by tapping screws 47 and screw grommets 48 so as to sandwich the door trim 2.

The restraint member 40 can be coupled or separated by a buckle 44. The buckle 44 is formed from a latch portion 45 and a striker portion 46. The buckle 44 is coupled by the striker portion 46 being inserted into the latch portion 45. The buckle 44 is separated by the striker portion 46 being removed from the latch portion 45.

In the above embodiment, the headrest fixing portion 11 for fixing the headrest main body 21 and the headrest pillar fixing portion 12 for fixing the headrest pillar portion 22 are arranged in the door trim 2 serving as the door interior member of the vehicle so as to be adjacent to each other in the longitudinal direction of the vehicle body. This makes it possible to appropriately store the headrest 20 in the door trim 2 to prevent the headrest main body 21 and the headrest pillar portion 22 from interfering with portions such as the armrest 3 and the lower pocket 4 arranged in the longitudinal direction of the vehicle body. Accordingly, the degree of freedom of design of the members around the door trim 2 can be improved.

The headrest fixing portion 11 which holds the headrest main body 21 is arranged above the lower pocket 4 formed in the lower portion of the door trim 2. Accordingly, since the lower pocket 4 is arranged adjacent around the headrest main body 21 while storing the headrest main body 21 in the headrest fixing portion 11, the extension amount of the headrest 20 toward the interior side of the vehicle compartment with reference to the door trim 2 can be reduced. This can minimize the reduction of an occupant seating space by the headrest 20.

The headrest fixing portion 11 is arranged below the armrest 3 expanded toward the interior side of the vehicle compartment and arranged in the door trim 2. Accordingly, the headrest 20 can be stored by effectively using the side surface of the door trim 2 on the interior side of the vehicle compartment.

Summary of Embodiment

<First Aspect>

There is provided a headrest storage structure including a headrest storage portion 10 configured to store a headrest 20 in an interior member 2 of a vehicle door 1, wherein the headrest storage portion 10 includes a headrest fixing portion 11 configured to store a headrest main body 21 and a headrest pillar fixing portion 12 configured to store a headrest pillar portion 22 extending from the headrest main body 21, and the headrest fixing portion 11 and the headrest pillar fixing portion 12 are arranged to be adjacent to each other in a longitudinal direction of a vehicle body.

According to the first aspect, the headrest 20 and the door trim 2 can appropriately be stored so as to prevent the headrest main body 21 and the headrest pillar portion 22 from interfering with portions such as the armrest 3 and the lower pocket 4 arranged in the longitudinal direction of the vehicle body. The degree of freedom of design of members around the door trim 2 can be improved.

<Second Aspect>

In the first aspect, a storage portion 4 configured to store an article except the headrest 20 is formed in the interior member 2, and the headrest fixing portion 11 is arranged above the storage portion 4.

According to the second aspect, since the storage portion 4 is arranged adjacent around the headrest main body 21 in a state in which the headrest main body 21 is stored in the headrest fixing portion 11, the extension amount of the headrest 20 toward the interior side of the vehicle compartment with reference to the door trim 2 can be reduced. Therefore, this can minimize the reduction of an occupant seating space by the headrest 20.

<Third Aspect>

In the first or second aspect, the headrest main body 21 is fixed to the headrest fixing portion 11 by a restraint member 40.

According to the third aspect, the headrest 20 can be fixed, and at the same time the stability upon storing a flat article such as a file in the storage portion 4 can be improved.

<Fourth Aspect>

In any one of the first to third aspects, the headrest pillar fixing portion 12 includes a groove portion **12*a* in a portion corresponding to the headrest pillar portion 22**.

According to the fourth aspect, since the rod-like headrest pillar portion 22 is stored in the groove portion **12*a*, the headrest 20 can be easily and stably held as compared with a conventional case in which the headrest pillar portion 22 is inserted via a hole. The headrest 20 can be stored while reducing the extension amount of the headrest pillar portion 22 toward the interior side of the vehicle compartment. In addition, the rigidity can be improved more by forming the groove portion 12*a* in the headrest pillar fixing portion 12** than the flat shape.

<Fifth Aspect>

In any one of the first to fourth aspects, the headrest fixing portion 11 has a shape recessed from a side surface **2*a* of the interior member 2 on the interior side of a vehicle compartment toward an exterior side of a vehicle, and a portion 14 of the headrest fixing portion 11 on a side opposite to the headrest pillar fixing portion 12 has a curved shape curved toward the exterior side of the vehicle from the side surface 2*a* of the interior member 2** in a longitudinal direction of a vehicle body.

According to the fifth embodiment, the headrest storage structure has a guide function when extracting/storing the headrest 20, thereby smoothly extracting/storing the headrest 20.

<Sixth Aspect>

In any one of the first to fifth aspects, the headrest fixing portion 11 is arranged below the armrest 3 arranged in the interior member 2 and expanded toward the interior side of the vehicle compartment.

According to the sixth aspect, the headrest 20 can be stored effectively using the side surface of the interior member 2 on the interior side of the vehicle compartment.

What is claimed is:

1. A headrest storage structure including a headrest storage portion configured to store a headrest in an interior member of a vehicle door, wherein the headrest storage portion includes a headrest fixing portion configured to store a headrest main body and a headrest pillar fixing portion configured to store a headrest pillar portion extending from the headrest main body, and the headrest fixing portion and the headrest pillar fixing portion are arranged to be adjacent to each other in a longitudinal direction of a vehicle body, wherein the headrest fixing portion has a shape recessed from a side surface of the interior member on the interior side of a vehicle compartment toward an exterior side of a vehicle, and a portion of the headrest fixing portion on a side opposite to the headrest pillar fixing portion has a curved toward the exterior side of the vehicle from a side surface of the interior member in a longitudinal direction of a vehicle body.

2. The structure according to claim 1, wherein a storage portion configured to store an article except the headrest is formed in the interior member, and the headrest fixing portion is arranged above the storage portion.

3. The structure according to claim 1, wherein the headrest main body is fixed to the headrest fixing portion by a restraint member.

4. The structure according to claim 1, wherein the headrest pillar fixing portion includes a groove portion in a portion corresponding to the headrest pillar portion.

5. The structure according to claim 1, wherein the headrest fixing portion is arranged below an armrest arranged in the interior member and expanded toward the interior side of the vehicle compartment.

6. A headrest storage structure including a headrest storage portion configured to store a headrest in an interior member of a vehicle door, wherein the headrest storage portion includes a headrest fixing portion configured to store a headrest main body and a headrest pillar fixing portion configured to store a headrest pillar portion extending from the headrest main body, and the headrest fixing portion and the headrest pillar fixing portion are arranged to be adjacent to each other in a longitudinal direction of a vehicle body, and the headrest main body is fixed to the headrest fixing portion by a restraint member.

7. The structure according to claim 6, wherein the restraint member is arranged so as to overlap the headrest main body stored in the headrest fixing portion, when viewed from the interior side of a vehicle compartment.

8. The structure according to claim 6, wherein a storage portion configured to store an article except the headrest is formed in the interior member, and the headrest fixing portion is arranged above the storage portion.

9. The structure according to claim 6, wherein the headrest pillar fixing portion includes a groove portion in a portion corresponding to the headrest pillar portion.

10. The structure according to claim 6, wherein the headrest fixing portion is arranged below an armrest arranged in the interior member and expanded toward the interior side of the vehicle compartment.

11. A headrest storage structure, wherein a door trim of a vehicle includes a headrest storage portion configured to store a headrest and a storage portion configured to store an article except the headrest, the headrest storage portion includes a headrest fixing portion configured to store a headrest main body and a headrest pillar fixing portion configured to store a headrest pillar portion extending from the headrest main body, and the headrest fixing portion and the headrest pillar fixing portion are arranged to be adjacent to each other in a longitudinal direction of a vehicle body, and the headrest pillar stored in the headrest pillar fixing portion is arranged above the storage portion of the door trim.

12. The structure according to claim 11, wherein the headrest pillar fixing portion includes a groove portion capable of storing the headrest pillar portion, the groove portion is formed in the longitudinal direction of the vehicle body.

13. The structure according to claim 11, wherein the headrest fixing portion is arranged below an armrest arranged in the interior member and expanded toward the interior side of the vehicle compartment.

* * * * *